United States Patent [19]
Van Maanen

[11] Patent Number: 6,098,785
[45] Date of Patent: Aug. 8, 2000

[54] CONVEYOR DEVICE FOR ACCELERATING A SERIES OF PRODUCTS

[75] Inventor: Johannes Dominicus Van Maanen, Berkel en Rodenrijs, Netherlands

[73] Assignee: Klockner Hansel Tevopharm B.V., Schiedam, Netherlands

[21] Appl. No.: 09/102,053

[22] Filed: Jun. 22, 1998

[30] Foreign Application Priority Data

Jun. 20, 1997 [NL] Netherlands ............................ 1006370

[51] Int. Cl.[7] .................................................. B65G 47/28
[52] U.S. Cl. .................................... 198/459.8; 198/461.1; 198/471.1
[58] Field of Search ............................. 198/459.8, 461.1, 198/428, 471.1, 459.1, 461.2, 460.1

[56] References Cited

U.S. PATENT DOCUMENTS

| | | | |
|---|---|---|---|
| 4,883,163 | 11/1989 | Gamberini et al. | 198/471.1 X |
| 5,022,511 | 6/1991 | Gorrieri et al. | 198/471.1 X |
| 5,096,043 | 3/1992 | Gorrieri et al. | 198/461.1 |
| 5,318,165 | 6/1994 | Spatafora et al. | 198/471.1 X |
| 5,915,523 | 6/1999 | Spatafora | 198/461.1 X |

FOREIGN PATENT DOCUMENTS 0 640 526  3/1995  European Pat. Off. .
0 711 720  5/1996  European Pat. Off. .

*Primary Examiner*—James R. Bidwell
*Attorney, Agent, or Firm*—Young & Thompson

[57] ABSTRACT

The invention relates to a conveyor device for accelerating a series of products. The conveyor device includes a feed device for supplying products at a feed velocity along a transport path in the direction of transport $T_1$. By operating an acceleration device located downstream of the feed device, the products are lifted up and transferred to a transfer device, which delivers the product downstream at regular intervals and at a higher velocity. The feed device includes a stationary take-over plate, and the acceleration device includes grippers which move along a hypocycloid path. In this case, the grippers preferably move along an essentially triangular path with a path section situated parallel to the direction of transport. By way of the grippers, the product which has been placed on the take-over plate is lifted up at a low initial velocity and is then accelerated in the direction of transport. Then, the product is taken over by a transfer device at a defined position and the product is delivered downstream at regular intervals and at a high velocity. Preferably, with the aid of a photocell and control unit, the velocity of the feed device is adjusted during constant operation of the acceleration device and the transfer device.

16 Claims, 7 Drawing Sheets

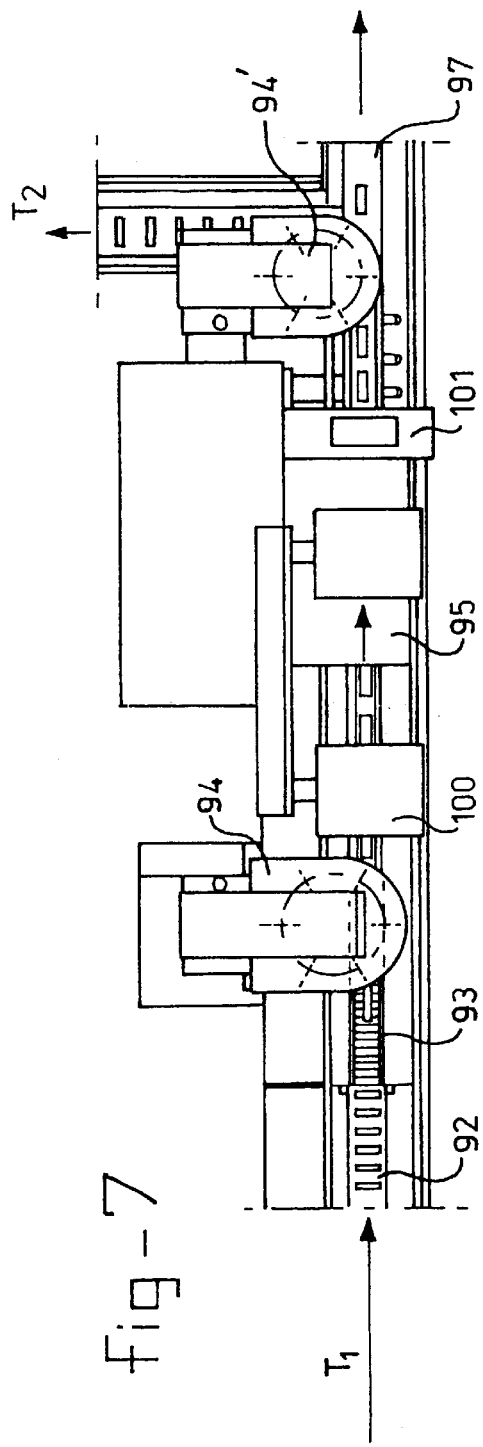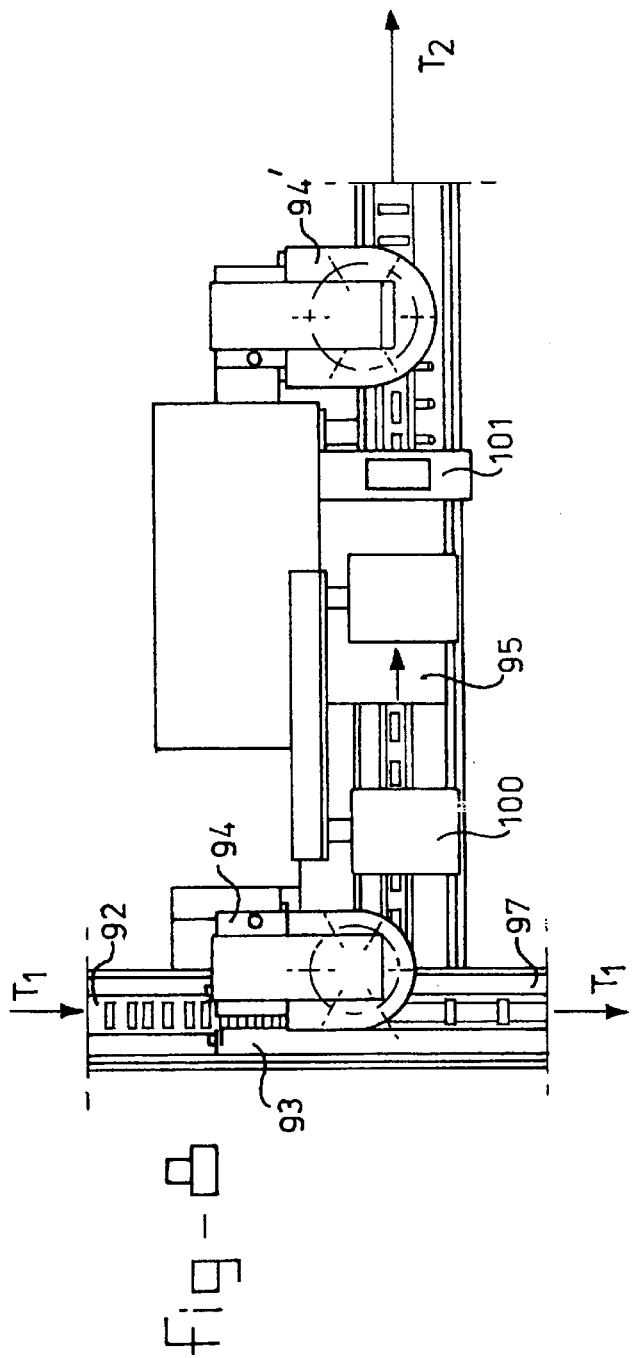

CONVEYOR DEVICE FOR ACCELERATING A SERIES OF PRODUCTS

BACKGROUND OF THE INVENTION

The invention relates to a conveyor device for accelerating a series of products, comprising:

a feed device for supplying products at a feed velocity along a transport path in the direction of transport, an acceleration device, which is positioned downstream of the feed device, with a gripper for lifting a product with respect to the transport path and accelerating the product in the direction of transport, and a transfer device for taking the accelerated product from the gripper.

The invention also relates to a packaging device comprising a conveyor device of this kind and to an acceleration device which is suitable for use in a conveyor device of this kind.

When packaging products, such as for example food products such as chocolate bars, biscuits and the like, these products are often delivered by the production installation in rows of transversely positioned products. By means of a feed system as described in European Patent No. EP-B-0,124, 177, these rows of products can be fed to a packaging machine. The packaging machine comprises a film feed and a folding plate for folding the film around the products. The film tube formed is provided, by means of longitudinal sealing rolls, with a longitudinal seal and, by means of transverse sealing tools, with transverse seals which also cut through the film tube in order to form separate packages containing one or more products.

Dutch Patent No. 172429 describes a drag conveyor with carrier members for the purpose of separating products which bear against one another in the longitudinal direction and feeding them to the film feed at a constant mutual distance, i.e. at regular intervals. On a feed belt, the arriving products are moved towards an adjoining conveyor belt which moves at a higher speed, so that a gap between the products is obtained. A stop mechanism ensures that the products are delivered from the adjoining conveyor belt to the drag conveyor in the correct manner even when starting up the device.

To package products which are supplied in the transverse direction in single packages, it is desirable for the transversely positioned products to be fed to the packaging machine in the longitudinal direction of the products and at regular intervals. For this, it is necessary for the products not only to be changed in orientation but also to be accelerated from an arrival speed which is equal to the product of the product width and the working capacity to a delivery speed which is equal to the product of the product length+ intervening space and the working capacity.

A conveyor device which comprises these characteristics in is described in European Patent Application EP-A-0,711, 720. In this device, a series of products supplied in the transverse direction is fed to an acceleration device via a conveyor belt which slopes upwards. The speed of the upwardly sloping conveyor belt is slower than the speed of the conveyor belt situated upstream thereof, so that products which are supplied at arbitrary intervals are conveyed onwards bearing against one another. Beneath the sloping conveyor belt, there is an acceleration device with a number of rotating gripper heads which grip the product fixedly in the region of the end of the conveyor belt and lift it up. After engaging on the product on the transport path, the gripper heads move radially outwards in order to lift the product off the transport path. Then, the product is accelerated by means of the gripper heads and is fed to a transfer device situated above the transport path. By means of the transfer device, the product is accelerated and guided further in the longitudinal direction of the product and at fixed intervals downstream of the acceleration device.

The position of the gripper heads of the known acceleration device is synchronized with the product position of the product to be accelerated by means of a photocell which is positioned in the region of the end of the upwardly sloping transport path. When the gripper head has reached the product to be accelerated, the gripper is displaced radially outwards by means of an electromagnet, in order to come into engagement with the product to be accelerated.

The known device is relatively complex, and consequently is susceptible to faults. When the product is taken up by a gripper head, the difference in velocity which occurs in this process between the product velocity on the sloping conveyor belt and the constant rotational speed of the said gripper head can cause an undesirable shift of the product to take place. Furthermore, as a result of detecting the product position on entry and, as a function of this detection, regulating the acceleration device, there is little time available for correcting any errors. Due to the fact that the position detection of the product to be accelerated takes place at a relatively late stage, the capacity of the known device will be relatively limited. Furthermore, owing to the upwardly sloping conveyor belt, the known device takes up a relatively large amount of space and the device has various operating levels, which is not preferred from the point of view of ease of use.

SUMMARY OF THE INVENTION

One object of the present invention is to provide a simple and fault-free conveyor device, which is also readily accessible, for changing the arbitrary intervals between supplied products to regular intervals, so that a high operating capacity can be achieved. A further object of the present invention is to provide a conveyor device which is relatively compact.

To this end, the conveyor device according to the present invention is characterized in that the feed device comprises a stationary take-over plate, the acceleration device comprising a carrier, which can rotate along a circular orbit path, with a gripper arm with the gripper attached thereto, which carrier can be rotated about a rotation pin which passes perpendicularly through the carrier, the diameter of the orbit path, the distance from the rotation pin to the orbit path and the position of the gripper arm with respect to the rotation pin of the carrier being designed in such a manner that the gripper describes a polygonal path, such as a virtually triangular path, with a path section which is situated virtually parallel to the direction of transport and begins in the region of the take-over plate, the speed of the gripper in the direction of transport being relatively low in the region of the take-over plate and increasing along the path section, and the gripper delivering the product to the transfer device at a delivery position situated along the path section at a higher velocity than the feed velocity.

By displacing the gripper arm along a hypocycloid path with an essentially polygonal shape, it is possible, with a constant drive of the carriers, to impart a movement to the gripper, the latter lifting the product off the take-over plate at the location of the take-over plate at a low velocity in the direction of transport, preferably at a velocity which is at least virtually equal to the feed velocity of the products onto the take-over plate. Since the grippers are lifted slightly in the region of the corners of the hypocycloid path, separate operating mechanisms for displacing the gripper in the radial direction can be dispensed with. Furthermore, owing to the low product velocity and low gripper velocity in the direction of transport at the moment of transfer, it is possible to achieve an operationally very reliable transfer of products from the feed device by means of the acceleration device.

The use of a take-over plate results in a simple design which does not interfere with the path of the grippers. Due to the fact that the products are moved forwards on the take-over plate by butting against one another, it is always ensured at the location of the take-over plate that the products bear against one another and the product positions at the moment at which they are taken up by a gripper are well defined.

After the product which has been placed on the take-over plate has been lifted up at the product feed velocity by means of the gripper, the product is accelerated in the direction of transport by means of the gripper, after which it is taken over by the transfer device at a higher velocity. The empty gripper slows down at the end of the path section, where it is again lifted slightly and then rotates along one of the limbs of the hypocycloid path, transversely to the direction of transport. The angular velocity of the carrier along the circular orbit path may be constant, but may also vary slightly around an average velocity. Furthermore, the circular orbit path may be positioned parallel to the plane of transport or may be situated perpendicular thereto. The circular orbit path may be situated above or below the plane of transport. In another embodiment, the circular orbit path is situated beneath the plane of transport of the feed device in a plane which is situated perpendicular to the plane of transport.

"Plane of transport" here refers to the plane along which the products are transported in the direction of transport at the location of the feed device. When the product is lifted up by the gripper on an orbit path which is situated above or below the plane of transport, the product can be lifted completely out of the plane of transport. However, it is also possible for the product to be lifted only to a very small extent, so that the pressure between the product and the plane of transport is reduced, so that the product can be slid and accelerated along the plane of transport by means of the gripper with reduced friction. In this case, it is also possible for one product, which is situated upstream, per group of products to be taken hold of by the gripper and for a plurality of products which are situated downstream of the product taken hold of to be simultaneously pushed up and accelerated and processed further as a group.

It should be noted that European Patent Application EP-A-0,731,022 has disclosed a gripper assembly for picking up a product downstream of the transverse sealing tools and for reorienting the packaged products from a longitudinal direction of the products into a transverse direction. In this assembly, the gripper arms are positioned rotatably on a carrier, which carrier can be rotated about a circular orbit path. The gripper heads run through an essentially triangular path. In the known device, the gripper device is used to rotate the products supplied through 90° with respect to the direction of transport. The known device is very much restricted to one specific product dimension, and cannot easily be adapted to changing product dimensions. Furthermore, the products are clamped in on both the top and bottom sides by means of the known device, so that the risk of damage to the products increases. Also, the known device does not provide any possibility of removing empty wrappers and unsealed films.

Finally, it is not clear from the abovementioned application how a gripper assembly of this nature can advantageously be used as an acceleration device according to the present invention.

Preferably, the orbit path of the conveyor device according to the present invention is formed by a circular running surface, the carrier comprising a carrier wheel which rolls along the running surface, the rotation pin passing through the centre point of the carrier part. In this case, the circular running surface comprises, for example, internal toothing, with which external toothing on the carrier wheel can engage. However, instead of internal toothing along the running surface, the rotation of the carrier or the carrier wheel can also take place by means of a gearwheel transmission or by means of a toothed belt and toothed belt pulley. Due to the fact that the carrier wheel rolls along the running surface at a constant velocity, the gripper arm, which is rotatably attached to the carrier wheel, will describe the virtually polygonal, preferably triangular, path with a movement in the direction of transport which is accelerated from the take-over plate, the product being lifted off the take-over plate. A device of this kind is of simple design and relatively compact.

According to a further embodiment of a conveyor device according to the invention, the velocity of the carrier along the peripheral path is synchronized with the velocity of the transfer device, a detector being positioned in the region of the take-over plate for the purpose of determining a product position and for transmitting a detection signal to a control unit, and the velocity of the feed device being varied by the control unit as a function of the detection signal, in such a manner that a product is placed on the take-over plate each time a gripper moves past the take-over plate. By regulating the phase of the products supplied by controlling the feed device, the acceleration device and the transfer device can be operated with a constant phase and their velocities do not have to be regulated. As a result, it is possible to obtain a simple acceleration device with which a high product capacity, such as for example 800–1000 products per minute or more, can be obtained.

Preferably, the acceleration device is provided with three carriers, each with a respective gripper arm and gripper. Although the velocity of the carriers around the centre point of the orbit path may vary, it is preferable to keep this velocity constant. The grippers of the acceleration device and the transfer device may be of mechanical design or may act without moving parts, by means of the application of a vacuum. In a preferred embodiment, in order to keep the position of the gripper arm directed vertically, a second circular running surface with a positioning wheel is provided, which second running surface is parallel to the first running surface and is situated at a predetermined distance therefrom, the projections of the running surfaces at least partially overlapping one another in a common plane, and the positioning wheel being connected to the gripper arm.

A conveyor device according to the present invention may be arranged upstream of the film feed or may be positioned downstream of the transverse sealing tools. To obtain a compact device, it is preferable for the transfer device to deliver the products in a direction of transport which is situated transverse to the direction of feed. If the conveyor device is located upstream of the film feed, the products may arrive at arbitrary intervals and in a transverse position, and they are delivered in the longitudinal direction and at regular intervals. However, the products may also arrive in a transverse position or in the longitudinal direction of the products and be delivered at regular intervals by the transfer device. If the conveyor device is located downstream of the transverse tools, the products may be supplied in a longitudinal position and delivered, for example to a multipacker, in the transverse position and at regular intervals, by means of the transfer device.

BRIEF DESCRIPTION OF THE DRAWINGS

The present invention will be discussed in more detail with reference to the appended drawing, in which:

FIGS. 7 and 8 show a packaging device provided with a conveyor device according to the present invention with two orientations of the product supply and product discharge.

DESCRIPTION OF THE PREFERRED EMBODIMENT

Figure 1:
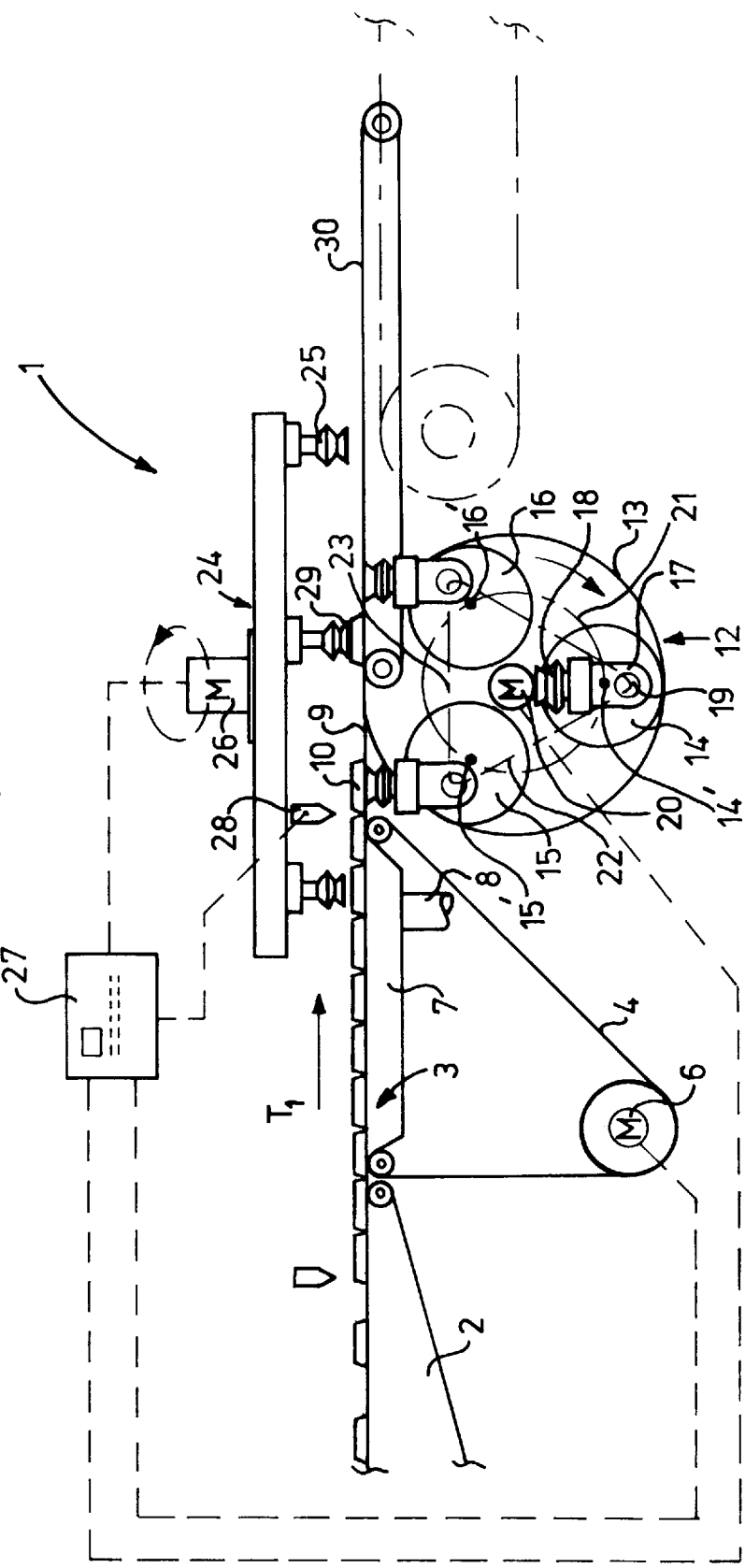
FIG. 1 shows a side view of a conveyor device according to the present invention, FIG. 2 diagrammatically shows a plan and side view of the device as shown in FIG. 1.
Figure 2:
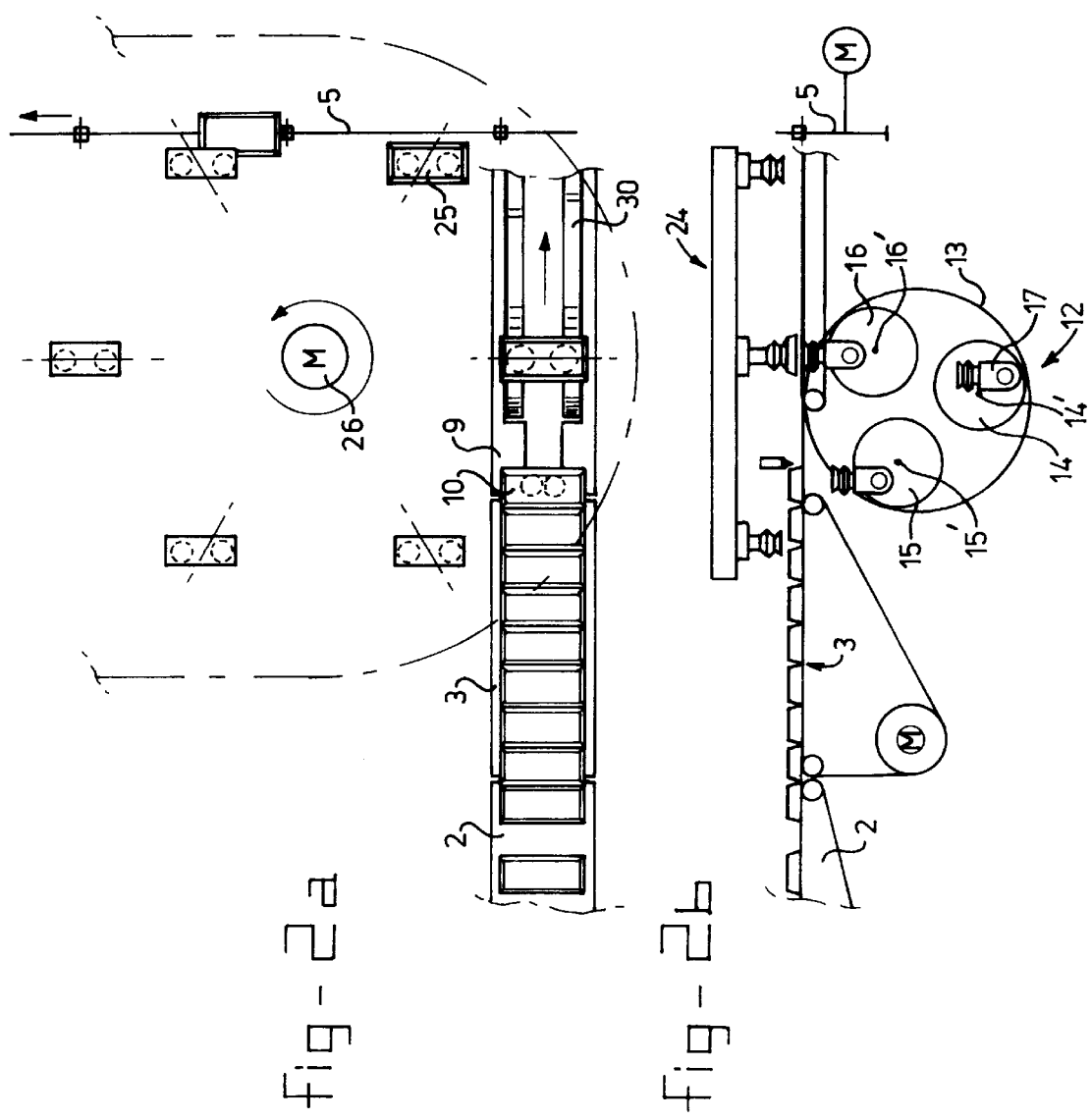

FIGS. 1 and 2 respectively show a side view and a plan view of a conveyor device 1 according to the present invention. Via a first conveyor belt 2, products are supplied at varying intervals in the direction of the arrow shown and in the transverse direction of the products. By means of a feed device 3, the products are taken from the conveyor belt 2 at a lower velocity, so that the products come to lie against one another. The feed device 3 comprises a conveyor belt 4, which is driven, via a drive wheel, by means of a motor 6. The products are held in place on the feed device 3 by means of a vacuum which is exerted on the products via vacuum case 7 which is connected, via a line 8, to a vacuum source (not shown in more detail). The conveyor belt 4 is perforated, so that the vacuum can act on the products. A stationary take-over plate 9, onto which the front product 10 of a series of products supplied is pushed by means of the products positioned behind it, is situated downstream of the feed device 3. An acceleration device 12 is disposed beneath the plane of the transport path which is formed by the supply belt 2 and the feed device 3. The acceleration device 12 comprises a circular orbit path 13, along which carriers, in the form of three orbiting wheels 14, 15 and 16, are able to rotate. Each orbiting wheel 14, 15, 16 can rotate about a rotation pin 14', 15', 16' which passes through the centre point of each wheel. Each orbiting wheel 14, 15, 16 comprises a gripper arm 17 with a gripper 18 at its end. The gripper arm 17 is attached to the orbiting wheel 14 such that it can rotate about a rotation pin 19. The same applies to the gripper arms of the orbiting wheels 15 and 16, although the reference numerals for these gripper arms have been omitted for the sake of clarity. By means of a motor 20, the orbiting wheels 14–16 are driven in rotation along the orbit path 13. During this process, the orbiting wheels roll, for example, along a running surface of the orbit path 13, and the centre point of each orbiting wheel describes a circular path 21. However, it is also possible for the orbiting wheels to be driven in rotation about their rotation pins 14', 15', 16' by means of a different drive, such as for example a set of toothed wheels or a drive belt. The gripper arms 17 describe an essentially triangular hypocycloid path 22 with a path section 23 which lies virtually parallel to the transport path of the products supplied.

In the region of the left-hand corner of the hypocycloid path 22, close to the take-over plate 9, the velocity of the gripper arm in the direction of transport is virtually equal to 0. At the corners of the path 22, the gripper arms are lifted up slightly, so as then to move back downwards with respect to the transport path towards the centre of the path section 23. Along the path section 23, the gripper arm is accelerated in the direction of transport. After having reached a sufficient level of acceleration, the product which has been lifted off the take-over plate 9 is moved onto a transfer device or transfer wheel 24.

The transfer wheel 24 comprises a number of grippers 25 and is rotated, by means of a motor 26, about an axis which is positioned vertically to the plane of transport and at a peripheral velocity which is greater than the feed velocity of the products along the feed device 3. The feed device 3, the acceleration device 12 and the transfer wheel 24 are each driven by means of a separate motor 6, 20 and 26. However, it is also possible to drive the acceleration device 12 and the transfer wheel 24 by means of a single motor, for example by means of the motor of a device which is situated downstream of the transfer wheel 24, such as a packaging machine. The motors 6, 20 and 26 are controlled by means of a control unit 27.

Via angle coders and tachogenerators (not shown in more detail), velocity and position signals from the feed device 3, the acceleration device 12 and the transfer wheel 24 are fed to the control unit 27. Furthermore, a photocell 28 which detects the position of the products supplied is positioned in the region of the take-over plate 9. On the basis of a detection signal formed by the photocell 28, the control unit 27 regulates the velocity of the feed device 3, the acceleration device 12 and the transfer wheel 24 being operated with a continuous phase. The feed device 3 is controlled by means of the control unit 27 in such a manner that at fixed, constant intervals in each case one product 10 is pushed onto the take-over plate 9, so that this product is ready to be taken up by a gripper of the acceleration device 12.

After delivering a product, such as a product 29, to one of the grippers of transfer wheel 24, the gripper of the corresponding gripper arm of the acceleration device 12 is deactivated. Preferably, the grippers comprise vacuum grippers, in which case, after the product has been taken over by the transfer wheel 24, the vacuum on the gripper of the acceleration device 12 is switched off. By means of the transfer wheel 24, the accelerated products are delivered, oriented in the longitudinal direction of the products, to a further conveyor device 5 (cf. FIG. 2a) which is situated transversely to the plane of the drawing. A discharge belt 30, along which products which have not been taken up by the transfer wheel 24 are discharged, is positioned downstream of the acceleration device 12. The products which have not been taken up by the transfer wheel 24 are pushed onto the discharge belt 30 via the take-over plate 9. In this way, it is possible not only to discharge faulty products or products which have not been taken up by the transfer wheel 24 via the discharge belt 30, but also for the products supplied to be alternately picked up by the transfer wheel 24 and discharged via the discharge belt 30. A second acceleration device 12 and second transfer wheel 24 may be accommodated downstream of the discharge belt 30.

Figure 3:
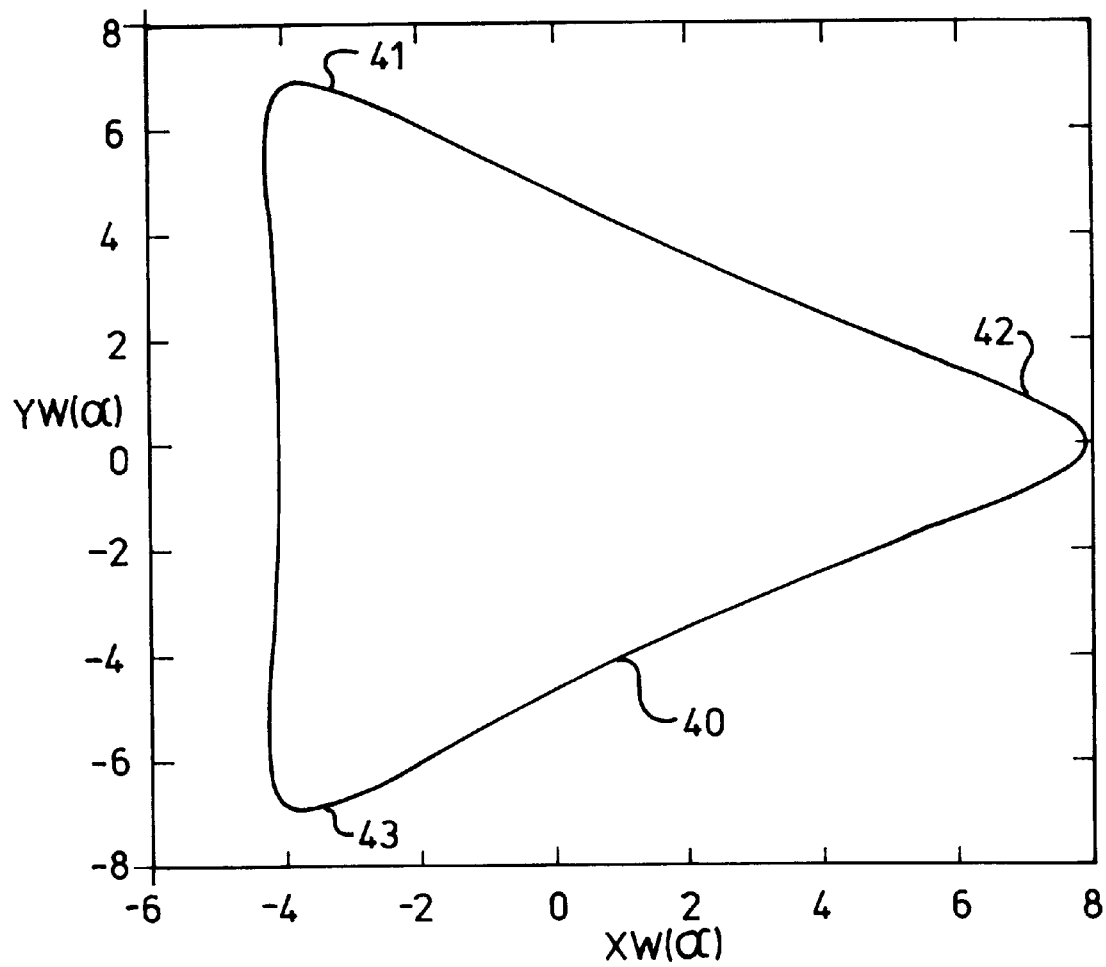
FIG. 3 shows a triangular, hypocycloid gripper path.

FIG. 3 shows the path which is described by the grippers of the acceleration device 12. FIG. 3 illustrates the coordinates of the grippers of the acceleration device 12. The X-coordinate $X_W(\alpha)$ and the Y-coordinate $Y_W(\alpha)$ of a gripper are given by the formulae $$X_W(\alpha) := R_1 \cos(\alpha) + R_W \cdot \cos(\beta(\alpha)) \text{ and}$$

$$Y_W(\alpha) := R_1 \sin(\alpha) + R_W \cdot \sin(\beta(\alpha)).$$

In these formulae, $R_1$=radius of the orbit path 13, $R_W$=the distance of the rotation pin 19 of the gripper arm 17 from the centre point 14' of the orbiting wheel 14, $\alpha$=the angular position of the orbiting wheel with respect to the centre point of the orbit path 13, and $\beta$=the angular position of the orbiting wheel around the centre point of the orbiting wheel. In FIG. 3, $R_1$=6, $R_W$=1.9, and the ratio between the radius of the orbit path, $R_1$, and the radius of the orbiting wheel=3.

As can be seen from FIG. 3, the triangular path comprises, in the region of the corners 41, 42, 43, an elevation with respect to the path sections situated between the corners. At the corners, the velocity of the grippers in the path direction is equal to 0. By positioning the corners 41–43 in the region of the take-over plate 9 and positioning a path section 41–42; 42–43 or 43–41 parallel to the direction of transport, a very advantageous displacement path is obtained for taking over and accelerating a product supplied.

Figure 4:
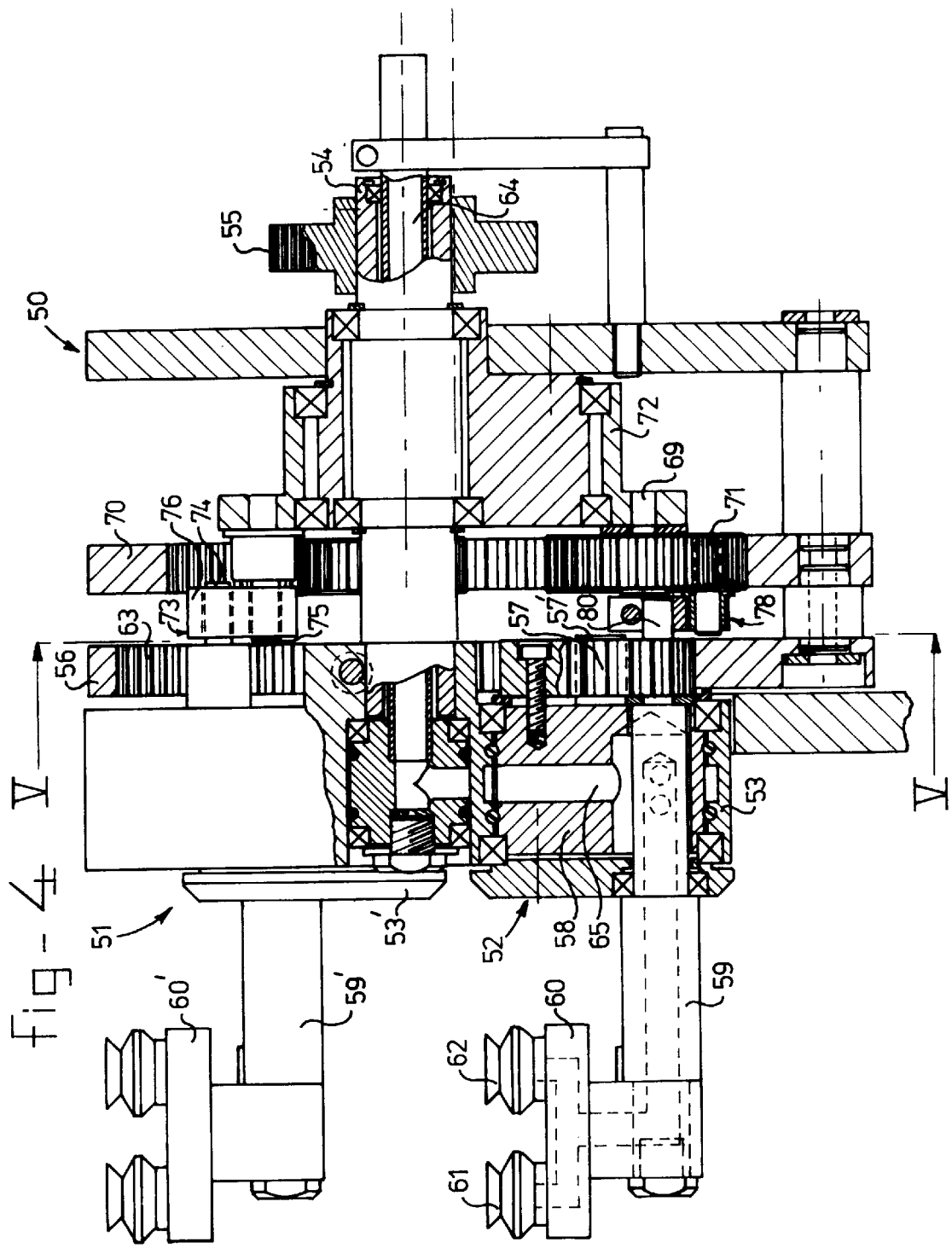
FIG. 4 shows a cross-section, from the side, of the acceleration device according to the present invention.

FIG. 4 shows a cross-section, from the side, of an acceleration device 50 according to a preferred embodiment of the invention. The acceleration device 50 comprises three orbiting wheels, of which two orbiting wheels 51, 52 are shown. Each orbiting wheel rotates in a housing 53, 53', which is driven in rotation by means of a central drive shaft 54. The central drive pin 54 is driven at a constant velocity by means of a toothed belt drive pulley 55 and a toothed belt or at a velocity which varies periodically about an average velocity. A central vacuum feed part 58 is rotatably mounted in the housing 53, 53' of the orbiting wheels 51, 52. The central feed part 58 is connected to a toothed wheel 57, which can rotate about a central rotation pin 57'. The toothed wheel 57 rolls along internal toothing 63 on a first toothed ring 56. The centre point of the toothed wheel 57 and the centre point of the vacuum feed part 58 describe a circular path.

A gripper arm 59 is connected to the central vacuum feed part 58 such that it can rotate about its own longitudinal axis. The position of the longitudinal axis of the gripper arm 59 with respect to the centre point of the toothed wheel 57 and the vacuum feed part 58 is selected in such a manner that, when the toothed wheel 57 rotates along the toothed ring 56, the gripper arm 59 and the gripper 60 connected thereto are moved along an essentially triangular path.

In order to keep the angular position of the gripper arms 59, 59' oriented correctly, in this case in a position which is such that the grippers 60, 60' always adopt a vertical position, a second toothed ring 70 is provided and the toothed wheels 57 are connected to corresponding positioning toothed wheels 71 which roll along the toothed ring 70.

The gripper heads 61, 62 of the gripper 60, which in this case comprise, for example, a plastic suction cup, are in fluid communication, via the gripper arm 59, with a vacuum chamber and a vacuum duct 65 in the vacuum feed part 58. During rotation of the vacuum feed part 58 about the central, stationary vacuum line 64, the vacuum duct 65 is periodically connected thereto. A vacuum is applied to the gripper heads 61, 62 at the moment that they engage on a product supplied and, after a gripper of the transfer device has taken over the product, this connection is interrupted again.

The toothed wheels 71 can rotate eccentrically about a rotation pin 69 which is attached to a carrier 72. The carrier 72 is mounted such that it can rotate about the drive shaft 54 and is driven in rotation via a first pin 74 on the outside of the housing 53, 53'. Via a transmission 73, the rotation of the orbiting wheels 51, 52 is transferred to the positioning toothed wheels 71. In this case, the axis of the toothed ring 70 is displaced with respect to the toothed ring 56 by a distance of, for example, 15 mm. The transmission 73 comprises a bearing block 76, in which the first pin 74 of the housing 51 and a second pin 75, which is connected to the carrier 72, are mounted.

The pin end 80 of the gripper arm 59 is connected, via a coupling 78, to the positioning toothed wheel 71. As can be seen from FIG. 5, which illustrates the positioning wheels, the coupling 78 comprises a clamping part 79 which is fixedly attached to the pin end 80. A projection 81 which is attached to the positioning toothed wheel 71 and describes a triangular path which is displaced slightly downwards with respect to the triangular path of the gripper arm 59 is displaceably held in a sliding shoe 82 of the coupling 78.

Figure 5:
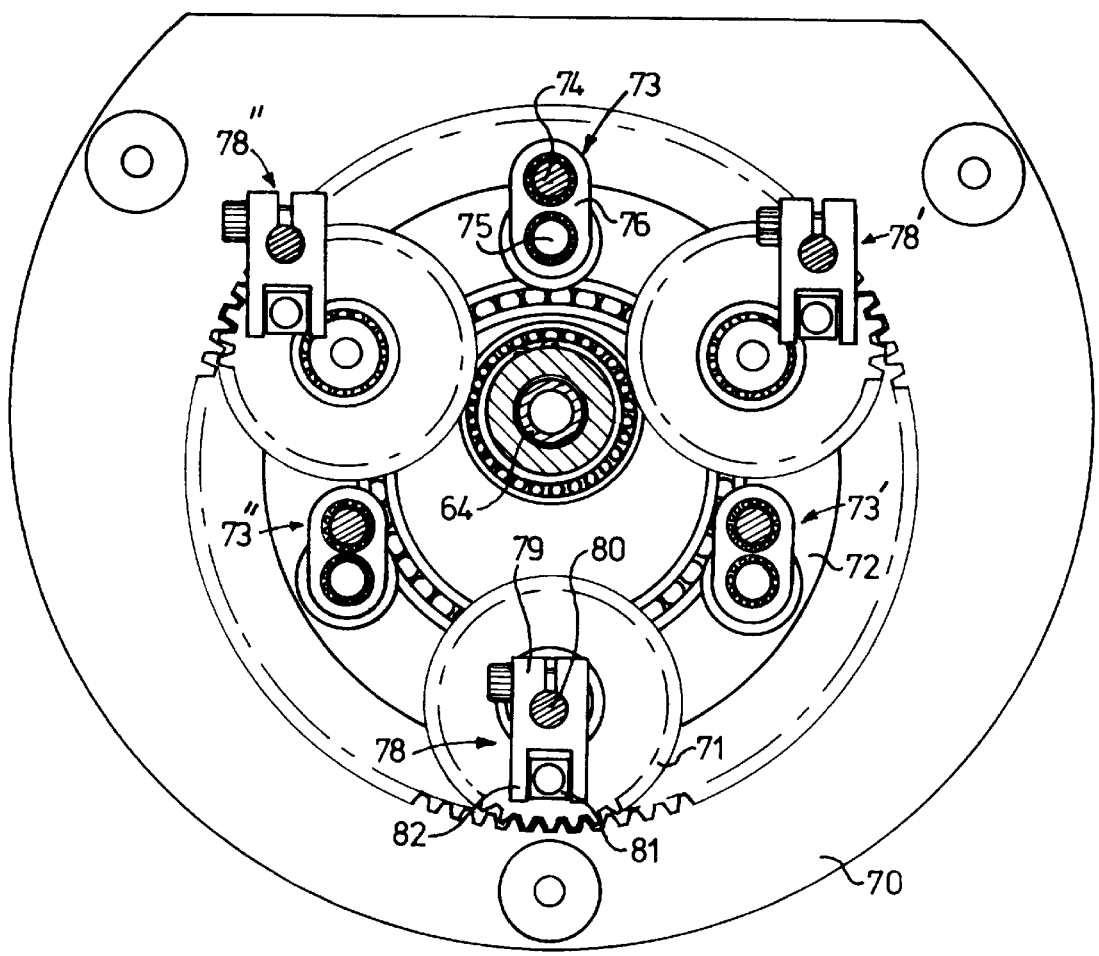
FIG. 5 shows a cross-section on line V—V in FIG. 4 of the positioning wheels, which have the same arrangement as the orbiting wheels according to the invention but are displaced with respect thereto.

In the event of rotation of the orbiting wheels 51, 52 via the central drive shaft 54, the carrier 72 is driven in rotation by means of the transmissions 73, 73', 73". As a result, the central pins 77 of the toothed wheels 71 move along a circular path and the positioning toothed wheels 71 roll along the toothing of the second toothed ring 70. As shown in FIG. 5, the coupling 78, 78', 78" adopts a vertical position for any position of the toothed wheel 71.

Figure 6:
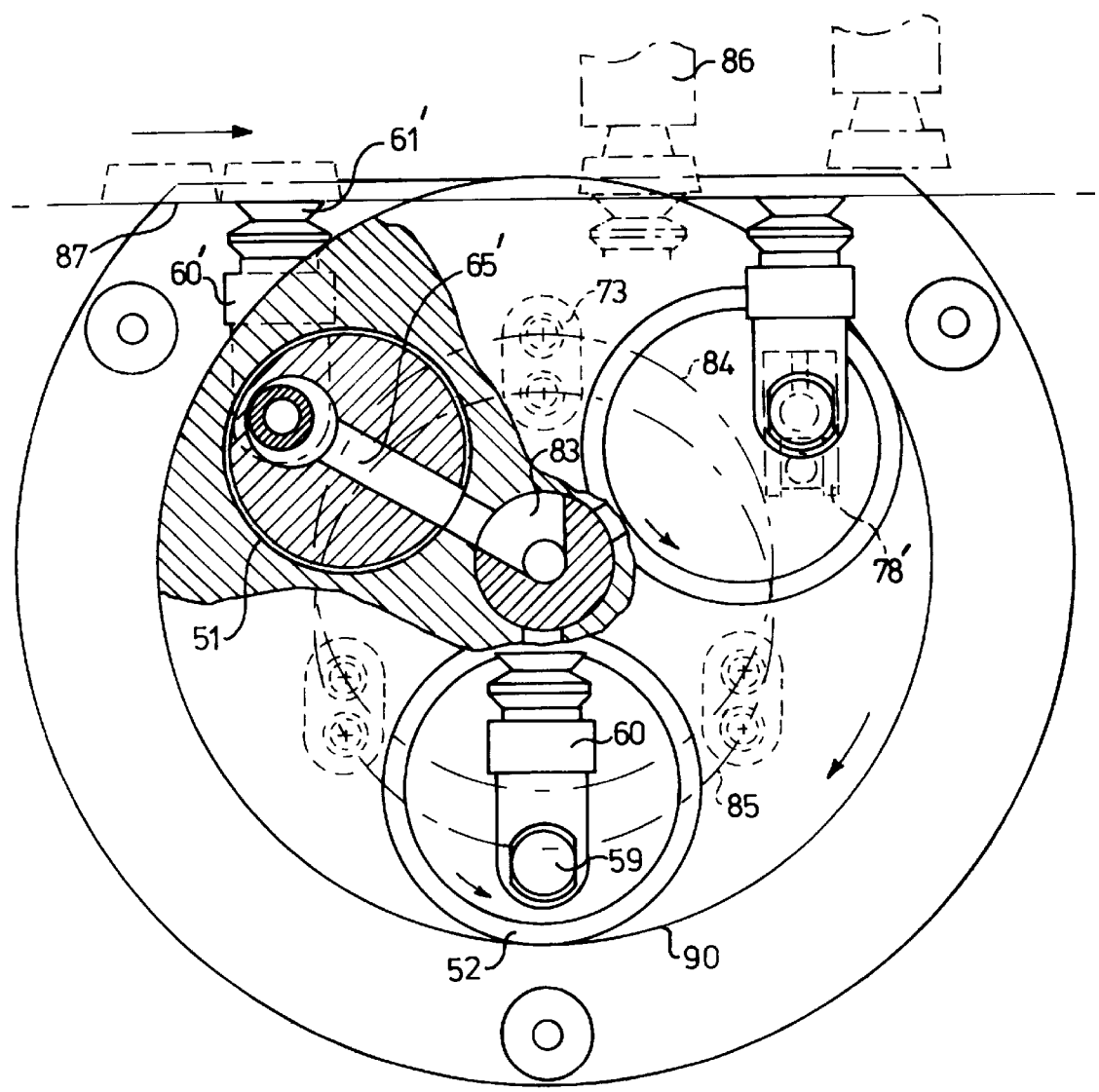
FIG. 6 shows a partially cut-away side view of the acceleration device according to the present invention.

As shown in FIG. 6, the orbiting wheels 51, 52 are rotated along an orbit path 90 in the direction of the arrow. The centre points of the orbiting wheels 51, 52 move along a first circular path 84. The positioning toothed wheels of the device for positioning the gripper arms 59 are moved with their centre points along the second circular path 85, so that the grippers 60, 60' remain vertically directed. For the angular position in which the gripper 60' is situated in the region of the take-over plate 87, a central vacuum chamber 83 is formed at the end of the vacuum line 64, with which chamber the duct 65, of the orbiting wheel 51 periodically comes into fluid communication during rotation. As a result, an arriving product is sucked onto the gripper head 61'. Then, the product which has been gripped is lifted off the take-over plate 87 in the vertical direction and is accelerated in the direction of transport. Then, when the product has been passed to a gripper 87 of the transfer wheel, the vacuum on the gripper head 61' is interrupted.

FIG. 7 shows an embodiment in which the products are supplied in the transverse direction of the products along a direction of transport $T_1$ on the supply belt 92. Then, the products are taken onto the feed device 93 of a conveyor device according to the present invention, only the transfer wheel 94 of which can be seen in the figure. By means of the transfer wheel 94 and the acceleration device situated beneath it, the products are placed at regular intervals from one another and accelerated, in order then to be packaged in the packaging machine 95. The packaging machine 95 comprises a film feed 100 (not shown in more detail) as well as longitudinal sealing rolls and transverse sealing tools 101 for shaping a film packaging around each product. A second conveyor device according to the present invention is disposed downstream of the packaging machine 95, only the transfer wheel 94' of this conveyor device being shown. By means of this conveyor device, the products are placed, in the transverse direction of the products, onto a discharge belt 96, which runs in a second direction of transport $T_2$ which is situated perpendicular to the first direction of transport $T_1$. Via the discharge belt 96, the individually packaged products can be fed, for example, to a multipacker or a stacker.

Products which are not taken hold of by the second transfer wheel 94' are discharged via a further conveyor belt 97 in the direction of transport $T_1$. The transfer wheel 94' can also be used without an acceleration device according to the invention.

FIG. 8 shows an arrangement in which the products are supplied in a direction of transport $T_1$, are accelerated by the transfer wheel 94 and are delivered at regular intervals and in the longitudinal direction of the products in a second direction of transport $T_2$, which is situated perpendicular thereto. Then, the products are packaged by means of the packaging machine 95 and, with the aid of a second conveyor device according to the invention comprising a second transfer wheel 94', are discharged, in the transverse direction of the products, in the second direction of transport $T_2$ towards, for example, a multipacker. In this case too, the second transfer wheel 94' may also be used without an acceleration device.

Although the invention has been described on the basis of an acceleration device comprising three orbiting wheels, the invention may also be used with only a single orbiting wheel which is rotated along a circular orbit path. In this case, the gripper path may again be polygonal, such as for example quadrangular, but is preferably essentially triangular. Furthermore, it is not necessary for the grippers of the acceleration device and of the transfer device each to lift up one product each time, but rather it is possible for the grippers to take hold of a plurality of adjacent products, so as to form groups of products.

What is claimed is:

1. Conveyor device (1) for accelerating a series of products, comprising:
   a feed device (3) for supplying products at a feed velocity along a transport path in the direction of transport ($T_1$),
   an acceleration device (12, 50), which is positioned downstream of the feed device, with a gripper (18, 60) for lifting a product with respect to the transport path and accelerating the product in the direction of transport ($T_1$), and
   a transfer device (24, 94, 94') for taking the accelerated product from the gripper (18, 60), characterized in that the feed device (3) comprises a stationary take-over plate (9, 87), the acceleration device (12, 50) comprising a carrier (14, 15, 16; 52, 57), which can rotate along a circular orbit path (13, 56), with a gripper arm (17, 59) with the gripper (18, 60) attached thereto, which carrier (14, 15, 16; 52, 57) can be rotated about a rotation pin (14', 15', 16'; 57') which passes perpendicularly through the carrier, the diameter of the orbit path (13, 56), the distance from the rotation pin (14', 15', 16'; 57') to the orbit path (13, 56) and the position of the gripper arm (17, 59) with respect to the rotation pin (14', 15', 16'; 57') of the carrier (14, 15, 16; 52, 57) being designed in such a manner that the gripper (18, 60) describes a polygonal path, such as a virtually triangular path (40), with a path section (41–42; 42–43; 43–41) which is situated virtually parallel to the direction of transport ($T_1$) and begins in the region of the take-over plate (9, 87), the speed of the gripper (18, 60) in the direction of transport being relatively low in the region of the take-over plate (9, 87) and increasing along the path section, and the gripper (18, 60) delivering the product to the transfer device (24, 94, 94') at a delivery position situated along the path section at a higher velocity than the feed velocity.

2. Conveyor device (1) according to claim 1, characterized in that the orbit path comprises a circular running surface (56), the carrier (52, 57) comprising a carrier wheel (57) which rolls along the running surface and the rotation pin (57') passing through the centre point of the carrier wheel (57).

3. Conveyor device (1) according to claim 1, characterized in that the velocity of the carrier (14, 15, 16; 52, 57) along the orbit path (13, 56) is synchronized with the velocity of the transfer device (24, 94, 94'), a detector (28) being positioned in the region of the take-over plate (9, 87) for the purpose of determining a product position and for transmitting a detection signal to a control unit (27), and the velocity of the feed device (3) being varied by the control unit (27) as a function of the detection signal, in such a manner that a product is placed on the take-over plate each time a gripper (18, 60) moves past the take-over plate (9, 87).

4. Conveyor device (1) according to claim 1, characterized in that the acceleration device (12, 50) is provided with three carriers (14, 15, 16; 52, 57), each with a respective gripper arm and gripper.

5. Conveyor device (1) according to claim 1, characterized in that the rotation pins (14', 15', 16', 57') of the carriers (14, 15, 16; 52, 57) rotate at a constant angular velocity about the centre point of the orbit path (13, 56).

6. Conveyor device (1) according to claim 1, characterized in that the transfer device (24, 94, 94') comprises an arm which rotates in a plane parallel to the transport path and has a transfer gripper (25) attached thereto.

7. Conveyor device (1) according to claim 1, characterized in that the grippers (18, 25, 60) of the acceleration device (12, 50) and/or of the transfer device (24, 94, 94') comprise vacuum grippers.

8. Conveyor device (1) according to claim 2, characterized in that the acceleration device (50) is provided with a second circular running surface (70) having projections thereon and a positioning wheel (71), which second running surface (70) is parallel to the first running surface (56) and is situated at a predetermined distance therefrom, the projections of the running surfaces (56, 70) being mutually displaced in a common plane and at least partially overlapping one another, and the positioning wheel (71) being connected to the gripper arm (59).

9. Conveyor device (1) according to claim 1, characterized in that the acceleration device (12, 50) is situated beneath the transport path.

10. Packaging device provided with a conveyor device (1) according to claim 1, the packaging device comprising a film feed for arranging a film around the products and transverse sealing tools for applying transverse seams to the film, characterized in that the conveyor device is located upstream of the film feed and/or downstream of the transverse tools.

11. Packaging device according to claim 10, characterized in that the direction of transport ($T_2$) of the products downstream of the transfer device (94') lies transverse to the direction of transport ($T_1$) upstream of the transfer device (94').

12. Packaging device according to claim 10, characterized in that the acceleration device is located upstream of the film feed, the products being supplied to the feed device in a transverse position and at varying intervals, and being delivered by the transfer device at regular intervals in a longitudinal direction of the products.

13. Packaging device according to claim 10, characterized in that the acceleration device is located downstream of the transverse sealing tools, the products being supplied to the feed device in a longitudinal direction of the products and at varying intervals, and being delivered by the transfer device at regular intervals in a longitudinal direction of the products.

14. Packaging device according to one of claim 10, characterized in that a conveyor belt (30) is situated downstream of the take-over plate.

15. An acceleration device for a conveyor system, the device comprising:

a carrier (14, 15, 16, 52, 57), which can rotate along a circular orbit path (13, 56), with a gripper arm (17, 59) with the gripper (18, 60) attached thereto, which carrier (14, 15, 16, 52, 57) can be rotated about a rotation pin (14', 15', 16'; 57') which passes perpendicularly through the carrier, the diameter of the orbit path (13, 56), the distance from the rotation pin (14', 15', 16', 57') to the orbit path (13, 56), and the position of the gripper arm (17, 59) with respect to the rotation pin (14', 15', 16'; 57') of the carrier (14, 15, 16; 52, 57) being designed in such a manner that the gripper (18, 60) describes a polygonal path, such as a virtually triangular path (40), characterized in that the orbit path comprises a circular running surface (56), the carrier (52, 57) comprising a carrier wheel (57) which rolls along the running surface, and the rotation pin (57') passing through the centre point of the carrier wheel (57).

16. Acceleration device according to claim 15, characterized in that the acceleration device (50) is provided with a second circular running surface (70) having projections thereon and a positioning wheel (71), which second running surface (70) is parallel to the first running surface (56) and is situated at a predetermined distance therefrom, the projections of the running surfaces (56, 70) being mutually displaced in a common plane and at least partially overlapping one another, and the positioning wheel (71) being connected to the gripper arm (59).

* * * * *